(12) United States Patent
Li

(10) Patent No.: US 12,402,097 B2
(45) Date of Patent: Aug. 26, 2025

(54) POSITIONING METHOD, TERMINAL, AND NETWORK DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 18/013,051

(22) PCT Filed: Jul. 1, 2020

(86) PCT No.: PCT/CN2020/099711
§ 371 (c)(1),
(2) Date: Dec. 27, 2022

(87) PCT Pub. No.: WO2022/000366
PCT Pub. Date: Jan. 6, 2022

(65) Prior Publication Data
US 2023/0247582 A1 Aug. 3, 2023

(51) Int. Cl.
*H04W 64/00* (2009.01)
*H04W 74/0833* (2024.01)

(52) U.S. Cl.
CPC ....... *H04W 64/00* (2013.01); *H04W 74/0833* (2013.01)

(58) Field of Classification Search
CPC ....... H04W 12/08; H04W 4/90; H04W 48/02; H04W 52/146; H04W 56/001;
(Continued)

(56) References Cited

U.S. PATENT DOCUMENTS

2017/0289933 A1* 10/2017 Segev .................... H04B 17/27
2019/0045577 A1* 2/2019 Kim ....................... H04W 76/19
(Continued)

FOREIGN PATENT DOCUMENTS

CN 110381578 A 10/2019
CN 111343567 A 6/2020

OTHER PUBLICATIONS

PCT/CN2020/099711, English translation of International Search Report dated Apr. 2, 2021, 3 pages.
(Continued)

*Primary Examiner* — Joseph Arevalo
(74) *Attorney, Agent, or Firm* — Cozen O'Connor

(57) ABSTRACT

A positioning method for a terminal in a wireless communication network includes: determining random access resources for positioning, the random access resources for positioning comprising time domain resources and frequency domain resources of random access channels for positioning, and random access preambles for positioning; and sending the random access preambles for positioning to a network device with the time domain resources and the frequency domain resources of the random access channels for positioning. A positioning method includes: receiving random access preambles for positioning sent by a terminal with time domain resources and frequency domain resources of random access channels for positioning; and performing positioning measurement on the terminal in response to receiving the random access preambles for positioning.

17 Claims, 5 Drawing Sheets

(58) Field of Classification Search
CPC . H04W 72/1268; H04W 72/20; H04W 72/51;
H04W 74/0833; H04W 76/19; H04W
76/27; H04W 76/28; H04W 76/50; H04W
84/12; H04L 5/0051; H04L 5/0055
USPC ....... 455/435.1, 450, 456.1, 422.1, 434, 522
See application file for complete search history.

(56) References Cited

U.S. PATENT DOCUMENTS

| | | | |
|---|---|---|---|
| 2019/0174456 A1* | 6/2019 | Johansson | H04W 64/003 |
| 2019/0327762 A1* | 10/2019 | Takeda | H04W 74/002 |
| 2020/0128588 A1* | 4/2020 | Xiong | H04W 72/0453 |
| 2020/0214047 A1* | 7/2020 | Chen | H04W 72/20 |
| 2022/0264653 A1* | 8/2022 | Xiong | H04L 1/0023 |
| 2023/0072763 A1* | 3/2023 | Kim | H04W 74/002 |

OTHER PUBLICATIONS

3GPP, Technical Specification Group Radio Access Network; NG Radio Access Network (NG-RAN); Stage 2 functional specification of User Equipment (UE) positioning in NG-RAN (Release 16); TS 38.305 V16.0.0, (Mar. 2020); 107 pages.

\* cited by examiner

POSITIONING METHOD, TERMINAL, AND NETWORK DEVICE

CROSS-REFERENCE TO RELATED APPLICATIONS

The present application is a National Stage of International Application No. PCT/CN2020/099711 filed on Jul. 1, 2020, the contents of all of which are incorporated herein by reference in their entireties for all purposes.

TECHNICAL FIELD

The present disclosure relates to wireless communication technologies, and in particular to a positioning method, terminal, and network device.

BACKGROUND

Terminal positioning refers to a technology of positioning a terminal through signal transmission between the terminal and a network device that is part of a wireless communication network. Signal measurement is performed by one of the terminal and the network device to determine a position of the terminal based on the measurement result.

SUMMARY

According to a first aspect of embodiments of the present disclosure, a positioning method is provided. The positioning method includes determining random access resources for positioning; in which the random access resources for positioning include time domain resources and frequency domain resources of random access channels for positioning, and random access preambles for positioning; and sending the random access preambles for positioning to a network device with the time domain resources and the frequency domain resources of the random access channels for positioning.

According to a second aspect of embodiments of the present disclosure, a positioning method is provided. The positioning method includes receiving random access preambles for positioning sent by a terminal with time domain resources and frequency domain resources of random access channels for positioning; in which the time domain resources and the frequency domain resources of the random access channels for positioning, and the random access preambles for positioning form random access resources for positioning; and performing positioning measurement on the terminal in response to receiving the random access preambles for positioning.

According to a third aspect of embodiments of the present disclosure, a terminal is provided. The terminal includes a processor; and a memory for storing instructions executable by the processor. The processor is configured to load and execute the executable instructions to perform the above-mentioned positioning method of the first aspect.

According to a fourth aspect of embodiments of the present disclosure, a network device is provided. The network device includes a processor; and a memory for storing instructions executable by the processor. The processor is configured to load and execute the executable instructions to perform the above-mentioned positioning method of the second aspect.

According to a fifth aspect of embodiments of the present disclosure, a non-transitory computer-readable storage medium is provided. The non-transitory computer-readable storage medium has stored therein instructions that, when executed by a processor, cause the processor to perform the above-mentioned positioning method of the first or second aspect.

It is to be understood that both the foregoing general description and the following detailed description are illustrative and explanatory only and are not intended to limit the embodiments of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used in embodiments of the present disclosure are for describing some embodiments only, and are not intended to limit the embodiments of the present disclosure. As used in embodiments of the present disclosure and the appended claims, "a/an", "said" and "the" in singular forms are also intended to include plural forms unless the context clearly indicates otherwise. It could also be understood that the term "and/or" as used herein refers to and includes any and all possible combinations of one or more associated listed items.

It could be understood that although the embodiments of the present disclosure may use the terms "first", "second", "third", etc. to describe various information, but the information is not limited to these terms. These terms are only used to distinguish information of the same type from each other. For example, without departing from the scope of embodiments of the present disclosure, first information may also be called second information, and similarly second information may also be called first information. Depending on the context, the word "if" as used herein may be interpreted as "upon" or "when" or "in response to determining".

It could be understood that although steps are described with numbers in embodiments of the present disclosure for ease of understanding, these numbers do not represent an execution order of the steps, and do not mean that the steps numbered sequentially are executed together. It could be understood that one or more steps of a plurality of steps numbered sequentially may be executed independently to solve corresponding technical problems and achieve a predetermined technical solution. Even though the plurality of steps are exemplarily listed together in drawings, which does not mean that these steps are executed together. The drawings only exemplarily list these steps together for ease of understanding.

Figure 1:
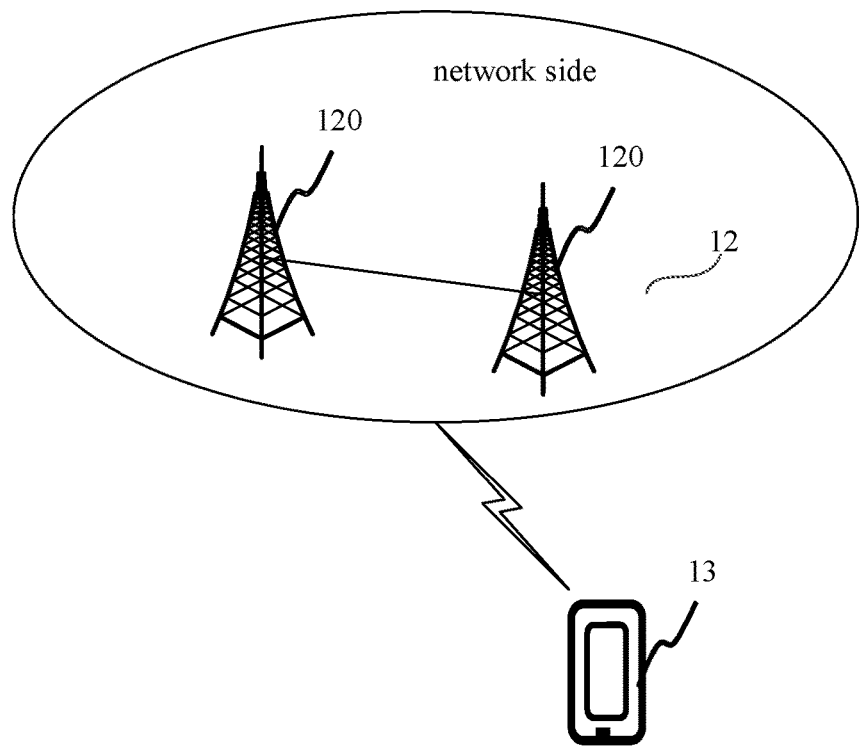
FIG. 1 is a block diagram illustrating a communication system according to an embodiment.

FIG. 1 is a block diagram illustrating a communication system according to an embodiment. As shown in FIG. 1, the communication system includes a network side 12 and a terminal 13.

The network side 12 includes several network devices 120. The network device 120 may be a base station, and the base station is a device deployed in an access network to provide a terminal with a wireless communication function. The base station may be a base station of a serving cell of the terminal 13, or a base station of a cell adjacent to a serving cell of the terminal 13. The base station may include a macro base station, a micro base station, a relay station, an access point, a transmission reception point (TRP) or other forms. In systems using different wireless access technologies, names of devices with base station functions may be different. For example, in 5G new radio (NR) systems, devices are called gNodeB or gNB. With the evolution of communication technology, the name for describing of "base station" may and change. The network device 120 may also be a location management function (LMF) entity.

The terminal 13 may include devices with wireless communication functions, such as various handheld devices, vehicle-mounted devices, wearable devices, or computing devices; and user equipment, mobile stations (MS), terminals, Internet of Things (IoT) devices, Industrial Internet of Things (IIoT) devices in various forms. For convenience of description, the devices mentioned above are collectively referred to as terminals. The network device 120 and the terminal 13 communicate with each other through a certain air radio technology, such as a Uu interface.

NR Rel-16 discusses positioning measurement for terminals in a connected state, and defines positioning reference signals including positioning reference signals (PRS) and sounding reference signals (SRS). However, there is no positioning method for use when a terminal is in an idle state or an inactive state in a related art.

In fact, there is a great demand for determining the position of a terminal (such as bracelets, watches or mobile phones for children) while the terminal is in the idle state or the inactive state. Parents would like to use their mobile phones to locate their child by locating the child's bracelet, watch or mobile phone, rather than making a phone call. In addition, there is a need to position intelligent home devices such as smart door locks and sweeping robots in an idle state, and in the case the devices in the idle state can be positioned, an appropriate time can be selected to operate these devices.

The communication systems and business scenarios described in embodiments of the present disclosure are for more clearly illustrating the technical solutions of the embodiments of the present disclosure, and do not constitute limitations on the technical solutions provided by embodiments of the present disclosure. With evolution of technologies and emergence of new business scenarios, the technical solutions provided by embodiments of the present disclosure may be applicable to similar technical problems.

Figure 2:
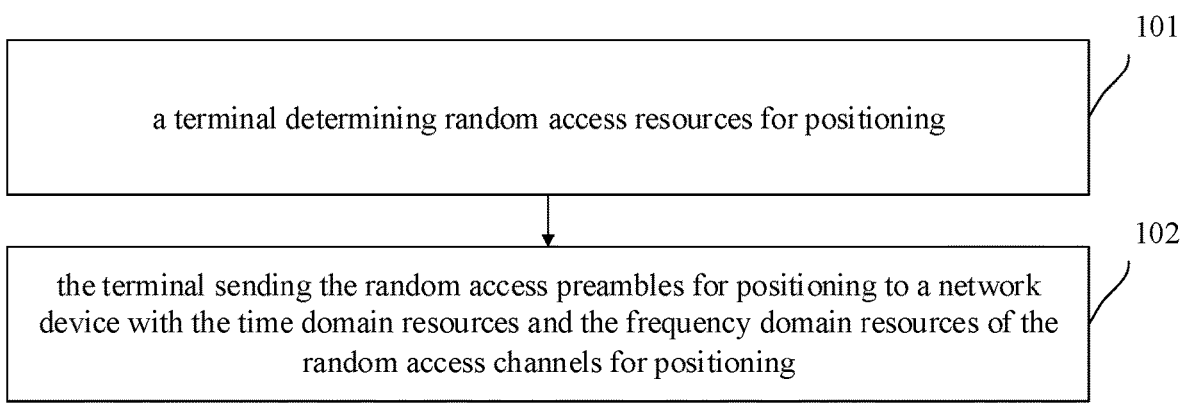
FIG. 2 is a flowchart illustrating a positioning method in a terminal, according to an embodiment.

FIG. 2 is a flowchart illustrating a positioning method according to an embodiment. As shown in FIG. 2, the positioning method includes the following operations in blocks 101 and 102.

In block 101, a terminal determines random access resources for positioning. The random access resources for positioning include time domain resources and frequency domain resources of random access channels for positioning, and random access preambles for positioning.

In some embodiments, the terminal here may be an idle state terminal, an inactive state terminal, a beam failure terminal, or a radio link failure terminal. In these several situations, the solutions provided by the present disclosure may be used for positioning measurement. Since the terminals include idle state terminals, the solutions in the present disclosure may be used for performing a positioning measurement on idle state terminals.

In block 102, the terminal sends the random access preambles for positioning to a network device with the time domain resources and the frequency domain resources of the random access channels for positioning.

For example, the network device here may be a network device in a serving cell of the terminal, or a network device in a cell adjacent to a serving cell of the terminal. For example, the network device may be a device corresponding to one or more TRPs in the serving cell of the terminal, or a device corresponding to one or more TRPs in the cell adjacent to the serving cell of the terminal.

In the embodiments of the present disclosure, the terminal sends the random access preambles for positioning to the network device with the time domain resources and the frequency domain resources of the random access channels for positioning in which these resources are determined by the terminal. The network device may perform positioning measurement of the terminal based on the preambles. Since the preambles are sent in an idle state of the terminal, the method may realize the positioning of the terminal in the idle state or an inactive state. In this way, the terminal may be positioned without entering the connected state, which reduces energy consumption of the terminal, and quickly obtains the positioning result once the terminal enters the connected state, thus reducing the positioning delay.

In some embodiments, the random access resources for positioning and random access resources for random access are different in at least one of the time domain resources, the frequency domain resources or the preambles.

When the random access resources for positioning are different from the random access resources for random access, the network device may determine whether the terminal performs random access or requests positioning measurement based on the difference between the random access resources for positioning and the random access resources for random access. For example, the random access resources for positioning may be different from the random access resources for random access in one, two or three above aspects.

In one case, all random access resources are used for random access. The present disclosure uses a part of the random access resources for random access as the random access resources for positioning, as long as the resources for random access and the resources for positioning are different in one dimension of the time domain, the frequency domain or the code domain. For example, the time domain resources and the frequency domain resources are the same, the preamble #1 is used for positioning, and other preambles are used for random access. Alternatively, the time domain resources and the preambles are the same, and a frequency domain resources with a lowest frequency point allocated for positioning. Alternatively, the frequency domain resources and the preambles are the same, and an earliest time domain resource in a time domain is allocated for positioning. In another case, the random access resources for positioning are newly allocated random access resources dedicated for positioning, and the random access resources for random access are not occupied. For example, the time domain resources and the frequency domain resources of the random access resources for positioning are the same as time domain resources and frequency domain resources of random access resources for random access, and random access preambles for positioning are newly configured. Alternatively, the frequency domain resources and the preambles of the random access resources for positioning are the same as frequency domain resources and preambles of random access resources for random access, and time domain resources for positioning are newly configured. Alternatively, the time domain resources and the preambles of the random access resources for positioning are the same as time domain resources and preambles of random access resources for random access, and frequency domain resources for positioning are newly configured.

Furthermore, in a case that the random access resources correspond to a synchronization signal block (SSB), the random access resources corresponding to different synchronization signal blocks are different, and the random access resources for positioning corresponding to different synchronization signal blocks are different.

For example, in random access resources corresponding to each synchronization signal block, a frequency domain resource with a lowest frequency point is allocated for positioning, and frequency domain resources with remaining frequency points are allocated for random access.

Alternatively, in random access resources corresponding to each synchronization signal block, an earliest time domain resource in a time domain is allocated for positioning, and remaining time domain resources are allocated for random access.

Alternatively, in random access resources corresponding to each synchronization signal block, a preamble with a smallest number is allocated for positioning, and preambles with remaining numbers are allocated for random access.

In a related art, when the terminal and the base station perform initial synchronization, the terminal detects the SSB sent by the base station to obtain an index of the SSB, and knows a symbol position of the SSB, thus achieving downlink symbol synchronization between the terminal and the base station. In order to achieve uplink synchronization, the terminal needs to send a random access (RA) preamble, and how to choose the preamble and which RO (RO refers to a time frequency resource) to send the preamble are determined based on the SSBs received by the user equipment, the SSBs sent by the base station and a location set of ROs. Therefore, different synchronization signal blocks correspond to different random access resources.

In some embodiments, the time domain resources, the frequency domain resources and the preambles of the random access resources for positioning are the same as time domain resources, frequency domain resources and preambles of random access resources for random access, respectively.

In the case where the random access resources for positioning are the same as the random access resources for random access, the same random access resources are used for both random access and positioning related indication. In this case, the terminal may send indication information to the network device during the random access process to instruct the network device to perform positioning-related operations. For example, a physical uplink shared channel (PUSCH) of MsgA or Msg3 is used to send indication information to the network device, the indication information includes a positioning measurement result of the terminal. The positioning measurement result is a measurement result obtained by the terminal performing measurement on a reference signal sent by the network device. The measurement result includes at least one of a signal strength measurement value, a time measurement value, or an angle measurement value.

For example, the signal strength measurement value includes at least one of a reference signal received power (RSRP), a reference signal received quality (RSRQ), or a received signal strength indicator (RSSI). The time measurement value includes at least one of a reference signal time difference (RSTD) or a receiving and transmitting time difference (Rx–Tx time difference). The angle measurement value includes at least one of an angle of departure (AoD) or an angle of arrival (AoA).

The terminal random access resource process may be classified in two types, i.e., type 1, a 4-step random access, and type 2, a 2-step random access. Msg3 is a message sent by the terminal to the network device during the 4-step random access process, and MsgA is a message sent by the terminal to the network device during the 2-step random access process.

In some embodiments, determining the random access resources for positioning includes: determining the random access resources for positioning based on at least one of a synchronization signal block sent by the network device, broadcast information sent by the network device, system information sent by the network device, a physical downlink control channel (PDCCH) sent by the network device, a positioning protocol message sent by a location management function entity, or a local storage (such as a default random access resource stored in a terminal chip).

The positioning protocol message includes, but is not limited to, an LTE positioning protocol (LPP) message and a new radio (NR) positioning protocol message.

In some embodiments, the terminal may determine the random access resources for positioning based on the above-mentioned manner.

In some embodiments, before determining the random access resources for positioning, the positioning method further includes determining a positioning request. The positioning request is configured to indicate a terminal to determine the random access resources for positioning.

The positioning request includes at least one of a positioning request triggered by a service of the terminal; a positioning request sent from the network device and obtained by monitoring the network device; or a positioning request sent from at least one of an access and mobility management function (AMF) entity or a location management function entity.

The positioning request triggered by the service of the terminal may be a positioning requirement triggered when the terminal uses an application (APP).

The terminal monitors the PDCCH, the broadcast information, the system information sent by the network device, and obtains the positioning request sent by the network device through the monitored information.

The access mobility management entity sends the positioning request to the terminal through the non-access stratum (NAS) message, and the location management function entity sends the positioning request through the positioning protocol message.

In some embodiments, after the terminal sends the positioning random access preamble, the positioning measurement may be completed in the following two ways. Transmission power values of the random access preambles for positioning are used to complete the positioning measurement. A measurement result of the positioning reference signal is used to complete the positioning measurement. Details of the two ways are described below.

In some embodiments, the positioning method further includes sending transmission power values of the random access preambles for positioning to at least one of the network device or a location management function entity.

In some embodiments, at least one of the network device or the location management function entity may determine a path loss between at least one of the network device or the location management function entity and the terminal according to the transmission power values of the random access preambles for positioning and receiving power values of the random access preambles for positioning, and determine a distance between at least one of the network device or the location management function entity and the terminal based on the path loss. The terminal may be positioned according to the distance between the several network devices and the terminal and the positions of the several network devices.

The terminal may directly send a magnitude of the transmission power value, or send the number of times of power increase to indicate the magnitude of the transmission power value. The transmission power value is a value obtained by increasing an initial transmission power for N times, and the initial transmission power value and the value increased each time is agreed between the terminal and the network device.

In some embodiments, when the terminal sends the positioning random access preambles, the terminal uses the power agreed with the network device or the positioning management function entity and there is no need to upload the transmission power value separately, and thus the network device or the positioning management functional entity may perform the location measurement.

The operation of sending the transmission power values of the random access preambles for positioning to at least one of the network device or the location management function entity includes at least one of: sending the transmission power values to the network device via a physical uplink shared channel (PUSCH) of MsgA or Msg3 during a random access process; sending the transmission power values to the location management function entity via at least one of a non-access stratum message or a positioning protocol message; sending the transmission power values to the network device via a PUSCH after a terminal completes a random access process and switches to a connected state; or sending the transmission power values to the location management function entity via a positioning protocol message after a terminal completes a random access process and switches to a connected state.

In some embodiments, the positioning method further includes receiving a positioning reference signal sent by the network device; obtaining a measurement result based on the positioning reference signal; and sending the measurement result to at least one of the network device or a location management function entity.

The operation of sending the measurement result to at least one of the network device or the location management function entity includes at least one of: sending the measurement result to the network device via a PUSCH of MsgA or Msg3 during a random access process; sending the measurement result to the location management function entity via at least one of a non-access stratum message or a positioning protocol message; sending the measurement result to the network device via a PUSCH after a terminal completes a random access process and switches to a connected state; or sending the measurement result to the location management function entity via a positioning protocol message after the terminal completes a random access process and switches to a connected state.

The specific content of the measurement result is as described above, and will not be repeated here.

In some embodiments, the positioning method further includes switching back to an idle state after sending the measurement result or completing a random access process.

In embodiments of the present disclosure, the terminal switching back to the idle state after the terminal sends the measurement result includes the following situations.

In a first situation, the terminal sends the measurement result by using MsgA or Msg3 during the random access process, and switches to the idle state after the sending is completed. Alternatively, the terminal sends the measurement result by using MsgA or Msg3 during the random access process, and switches to the idle state after receiving a reply from MsgA (that is, MsgB) or a reply from Msg3 (that is, Msg4).

In a second situation, after the random access process is completed, the terminal enters the connected state, sends the measurement result by using a PUSCH or LPP signaling in the connected state, and switches to the idle state after the sending is completed.

In a third situation, after the random access process is completed, the terminal enters the connected state, sends the measurement result by using a PUSCH or LPP signaling in the connected state, preforms service transmission by using the positioning results after the sending is completed, and switches to the idle state after the service transmission is completed.

In some embodiments, the positioning method further includes at least one of: sending a unique identifier of a terminal to the network device via a PUSCH of MsgA or Msg3 during a random access process; sending a unique identifier of a terminal to the location management function entity via at least one of a non-access stratum message or a positioning protocol message; sending a unique identifier of a terminal to the network device through a PUSCH after the terminal completes a random access process and switches to a connected state; or sending a unique identifier of a terminal to the location management function entity via a positioning protocol message after the terminal completes a random access process and switches to a connected state.

For example, the unique identifier of the terminal may be a user equipment identifier (UE ID), and the UE ID may be one of a cell radio network temporary identifier (C-RNTI), a temporary C-RNTI, or a NAS UE ID.

In the above-mentioned process, the unique identifier of the terminal is sent to at least one of the network device or the location management functional entity, which is used to inform at least one of the network device or the location management functional entity which terminal sent the random access preambles for positioning, to realize the positioning measurement for the terminal.

It is noted that the above-mentioned operations in blocks 101 and 102 can be combined with any of the above-mentioned optional operations.

Figure 3:
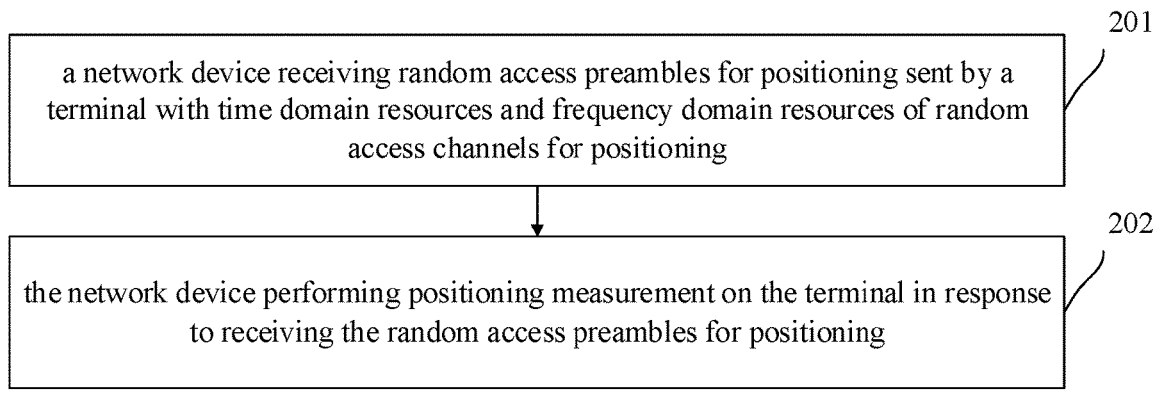
FIG. 3 is a flowchart illustrating a positioning method in a network device, according to an embodiment.

FIG. 3 is a flowchart illustrating a positioning method according to an embodiment. As shown in FIG. 3, the positioning method includes the following operations in blocks 201 and 202.

In block 201, the network device receives random access preambles for positioning sent by a terminal with time domain resources and frequency domain resources of random access channels for positioning. The time domain resources and the frequency domain resources of the random access channels for positioning, and the random access preambles for positioning form random access resources for positioning.

In block 202, the network device performs positioning measurement on the terminal in response to receiving the random access preambles for positioning.

In the embodiments of the present disclosure, the terminal sends the random access preambles for positioning to the network device with the time domain resources and the frequency domain resources of the random access channels for positioning in which these resources are determined by the terminal. The network device may perform the positioning measurement for the terminal based on the preambles. Since the preambles are sent in the idle state of the terminal, the method may realize the positioning of the terminal in the idle state or the inactive state. In this way, the terminal may be positioned without entering the connected state, which reduces energy consumption of the terminal, and quickly obtains the positioning result once the terminal enters the connected state, thus reducing the positioning delay.

In some embodiments, at least one of the time domain resources, the random access resources for positioning and random access resources for random access are different in at least one of the time domain resources, the frequency domain resources or the preambles.

Alternatively, the time domain resources, the frequency domain resources and the preambles of the random access resources for positioning are the same as time domain resources, frequency domain resources and preambles of random access resources for random access, respectively.

In some embodiments, in random access resources corresponding to each synchronization signal block, a frequency domain resource with a lowest frequency point is allocated for positioning, and frequency domain resources with remaining frequency points are allocated for random access.

Alternatively, in random access resources corresponding to each synchronization signal block, an earliest time domain resource in a time domain is allocated for positioning, and remaining time domain resources are allocated for random access.

Alternatively, in random access resources corresponding to each synchronization signal block, a preamble with a smallest number is allocated for positioning, and preambles with remaining numbers are allocated for random access.

In some embodiments, performing positioning measurement on the terminal includes receiving transmission power values of the random access preambles for positioning sent by the terminal; and determining a distance between a network device and the terminal based on the transmission power values and a received signal strength value for receiving the random access preambles for positioning.

In some embodiments, receiving the transmission power values of the random access preambles for positioning sent by the terminal includes receiving the transmission power values sent by the terminal via a PUSCH of MsgA or Msg3 during a random access process; or receiving the transmission power values sent by the terminal via a PUSCH when the terminal is in a connected state.

In some embodiments, performing positioning measurement on the terminal includes sending a positioning reference signal to the terminal; receiving a measurement result sent by the terminal and obtained based on the positioning reference signal; and determining a distance between a network device and the terminal based on the measurement result.

In some embodiments, receiving the measurement result sent by the terminal and obtained based on the positioning reference signal includes receiving the measurement result sent by the terminal via a PUSCH of MsgA or Msg3 during a random access process; or receiving the measurement result sent by the terminal via a PUSCH when the terminal is in a connected state.

In some embodiments, the measurement result includes at least one of a signal strength measurement value, a time measurement value, or an angle measurement value.

For example, the signal strength measurement value includes at least one of RSRP, RSRQ, or RSSI. The time measurement value includes at least one of RSTD or a receiving and transmitting time difference. The angle measurement value includes at least one of AoD or AoA.

In some embodiments, the positioning method further includes receiving a unique identifier sent by the terminal via a PUSCH of MsgA or Msg3 during a random access process; or receiving the unique identifier sent by the terminal via a PUSCH when the terminal is in a connected state.

For example, the unique identifier of the terminal may be a UE ID, and the UE ID may be one of a C-RNTI, a temporary C-RNTI, or a NAS UE ID.

In some embodiments, the positioning method further includes: sending a synchronization signal block, broadcast information, system information or a PDCCH to the terminal. The synchronization signal block, the broadcast information, the system information or the PDCCH is configured to indicate the random access resources for positioning.

It is noted that the above-mentioned operations in blocks 201 and 202 can be combined with any of the above-mentioned optional operations.

Figure 4:
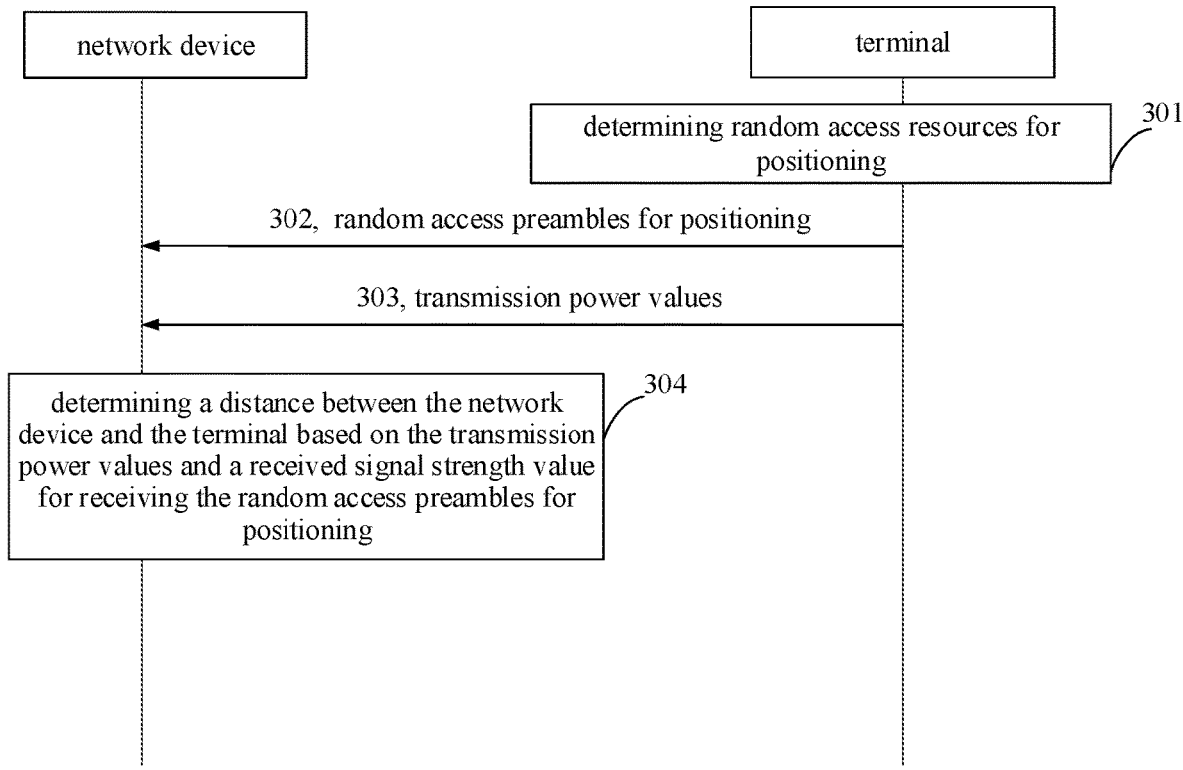
FIG. 4 is a flowchart illustrating a positioning method between a terminal and a network device, according to an embodiment.

FIG. 4 is a flowchart illustrating a positioning method according to an embodiment. As shown in FIG. 4, the positioning method includes the following operations 301-304.

In operation 301, a terminal determines random access resources for positioning. The random access resources for positioning include time domain resources and frequency domain resources of random access channels for positioning, and random access preambles for positioning.

For example, the terminal may determine the random access resources for positioning based on at least one of a synchronization signal block sent by the network device, broadcast information sent by the network device, system information sent by the network device, a physical downlink control channel sent by the network device, a positioning protocol message sent by a location management function entity, or a local storage.

In some embodiments, before determining the random access resources for positioning, the positioning method further includes determining a positioning request. The positioning request is configured to indicate the terminal to determine the random access resources for positioning.

The positioning request includes at least one of a positioning request triggered by a service of the terminal; a positioning request sent from the network device and obtained by monitoring the network device; or a positioning request sent from at least one of an access and mobility management function entity or a location management function entity.

In operation 302, the terminal sends the random access preambles for positioning to a network device with the time domain resources and the frequency domain resources of the random access channels for positioning. The network device receives the random access preambles for positioning sent by the terminal with the time domain resources and the frequency domain resources of the random access channels for positioning.

In some embodiments, the random access resources for positioning and random access resources for random access are different in at least one of the time domain resources, the frequency domain resources or the preambles.

Alternatively, the time domain resources, the frequency domain resources and the preambles of the random access resources for positioning are the same as time domain resources, frequency domain resources and preambles of random access resources for random access, respectively.

In operation 303, the terminal sends transmission power values of the random access preambles for positioning to the network device. The network device receives the transmission power values of the random access preambles for positioning send by the terminal.

For example, the terminal sends the transmission power values to the network device via a PUSCH of MsgA or Msg3 during a random access process.

Alternatively, the terminal sends the transmission power values to the network device via a PUSCH after the terminal completes a random access process and switches to a connected state.

In operation 304, the network device determines a distance between the network device and the terminal based on the transmission power values and a received signal strength value for receiving the random access preambles for positioning.

The network device may determine a path loss between the network device and the terminal according to the transmission power values of the random access preambles for positioning and receiving power values of the random access preambles for positioning, and determine a distance between the network device and the terminal based on the path loss. The terminal may be positioned according to the distance between the several network devices and the terminal, and the positions of the several network devices.

After the position of the terminal is determined, the network device may send a position result to the terminal after the terminal is connected, and the terminal may perform service transmission in the connected state with the position result.

Figure 5:
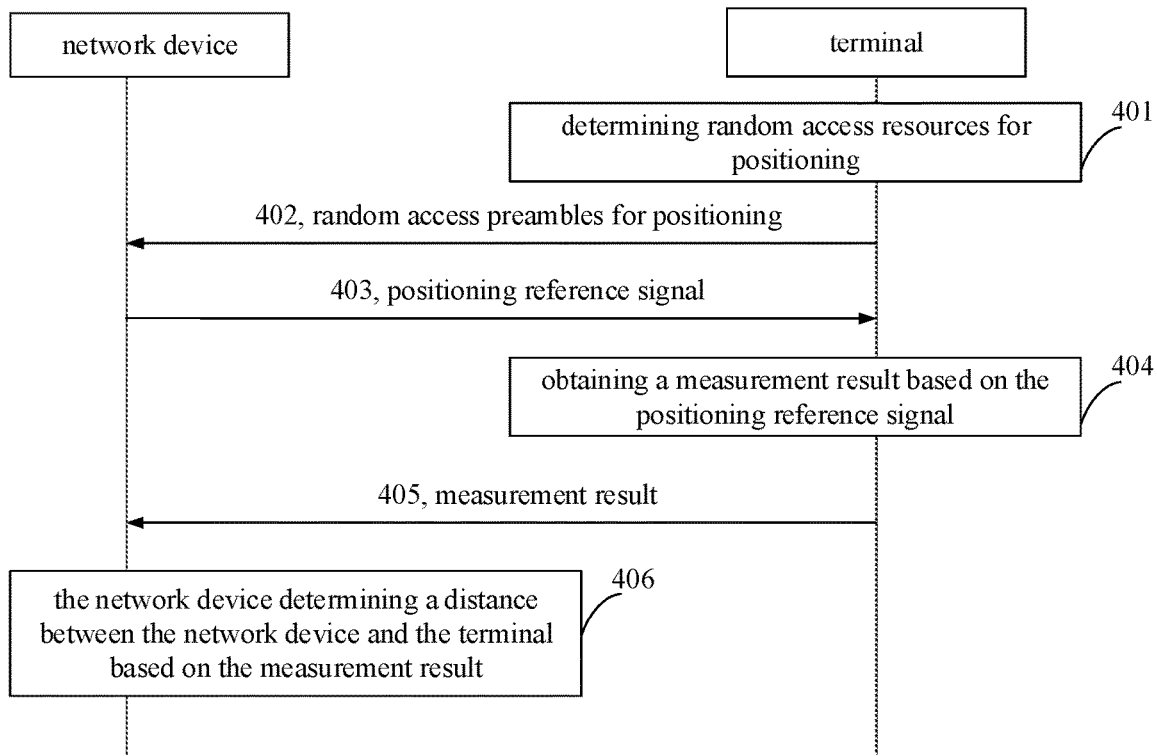
FIG. 5 is a flowchart illustrating a positioning method between a terminal and a network device, according to an embodiment.

FIG. 5 is a flowchart illustrating a positioning method according to an embodiment. As shown in FIG. 5, the positioning method includes the following operations 401-406.

In operation 401, a terminal determines random access resources for positioning. The random access resources for positioning include time domain resources and frequency domain resources of random access channels for positioning, and random access preambles for positioning.

The process of the terminal determining the random access resources for positioning may be referred to as in operation 301.

In operation 402, the terminal sends the random access preambles for positioning to a network device with the time domain resources and the frequency domain resources of the random access channels for positioning. The network device receives the random access preambles for positioning sent by the terminal with the time domain resources and the frequency domain resources of the random access channels for positioning.

In some embodiments, the random access resources for positioning and random access resources for random access are different in at least one of the time domain resources, the frequency domain resources or the preambles.

Alternatively, the time domain resources, the frequency domain resources and the preambles of the random access resources for positioning are the same as time domain resources, frequency domain resources and preambles of random access resources for random access, respectively.

In operation 403, the network device sends a positioning reference signal to the terminal. The terminal receives the positioning reference signal sent by the network device.

It is noted that the operation 403 of sending the positioning reference signal to the terminal may be performed before operation 401. For example, a periodic broadcast positioning reference signal is sent from the network device. After the terminal has measured the positioning reference signal, operations 401, 402, 404, 405 and 406 may be executed.

In operation 404, the terminal obtains a measurement result based on the positioning reference signal.

For example, the measurement result includes at least one of a signal strength measurement value, a time measurement value, or an angle measurement value.

In operation 405, the terminal sends the measurement result the network device. The network device receives the measurement result sent by the terminal and obtained based on the positioning reference signal.

The terminal may send the measurement result in the same way as the power value described in operation 303.

In operation 406, the network device determines a distance between a network device and the terminal based on the measurement result.

For example, the network device may determine the distance between the network device and the terminal based on a signal strength measurement value. The terminal may be positioned by the distance between several network device(s) and the terminal, and the position(s) of the several network device(s).

After the position of the terminal is determined, the network device may send a position result to the terminal after the terminal is connected, and the terminal may perform service transmission in the connected state with the position result.

Figure 6:
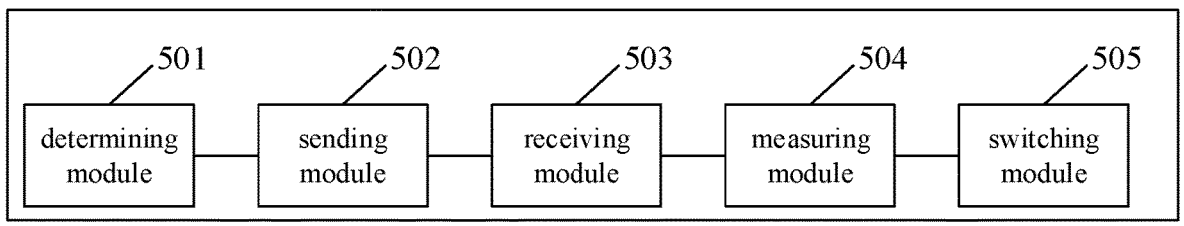
FIG. 6 is a schematic diagram illustrating a positioning apparatus according to an embodiment.

FIG. 6 is a schematic diagram illustrating a positioning apparatus according to an embodiment. The apparatus has the function of implementing the terminal in the above-mentioned method embodiments. The function may be realized by hardware or by executing corresponding software with hardware. As shown in FIG. 6, the positioning apparatus includes a determining module 501 and a sending module 502.

The determining module 501 is configured to determine random access resources for positioning. The random access resources for positioning include time domain resources and frequency domain resources of random access channels for positioning, and random access preambles for positioning.

The sending module 502 is configured to send the random access preambles for positioning to a network device with the time domain resources and the frequency domain resources of the random access channels for positioning.

In some embodiments, the random access resources for positioning and random access resources for random access are different in at least one of the time domain resources, the frequency domain resources or the preambles.

Alternatively, the time domain resources, the frequency domain resources and the preambles of the random access resources for positioning are the same as time domain resources, frequency domain resources and preambles of random access resources for random access, respectively.

In some embodiments, in random access resources corresponding to each synchronization signal block, a frequency domain resource with a lowest frequency point is allocated for positioning, and frequency domain resources with remaining frequency points are allocated for random access.

Alternatively, in random access resources corresponding to each synchronization signal block, an earliest time domain resource in a time domain is allocated for positioning, and remaining time domain resources are allocated for random access.

Alternatively, in random access resources corresponding to each synchronization signal block, a preamble with a smallest number is allocated for positioning, and preambles with remaining numbers are allocated for random access.

In some embodiments, the determining module 501 is configured to determine the random access resources for positioning based on at least one of a synchronization signal block sent by the network device, broadcast information sent by the network device, system information sent by the network device, a physical downlink control channel (PDCCH) sent by the network device, a positioning protocol message sent by a location management function entity, or a local storage.

In some embodiments, the determining module 501 is configured to a positioning request, wherein the positioning request is configured to indicate a terminal to determine the random access resources for positioning.

The positioning request includes at least one of a positioning request triggered by a service of the terminal; a positioning request sent from the network device and obtained by monitoring the network device; or a positioning request sent from at least one of an access and mobility management function entity or a location management function entity.

In some embodiments, the sending module 502 is configured to send transmission power values of the random access preambles for positioning to at least one of the network device or a location management function entity.

In some embodiments, the sending module 502 is configured, in at least one of the following manners, to send the transmission power values to the network device via a physical uplink shared channel (PUSCH) of MsgA or Msg3 during a random access process, or send the transmission power values to the location management function entity via at least one of a non-access stratum message or a positioning protocol message.

Alternatively, the sending module 502 is configured, in at least one of the following manners, to send the transmission power values to the network device via a PUSCH after a terminal completes a random access process and switches to a connected state, or send the transmission power values to the location management function entity via a positioning protocol message.

In some embodiments, the positioning apparatus further includes a receiving module 503, a measuring module 504. The receiving module 503 is configured to receive a positioning reference signal sent by the network device. The measuring module 504 is configured to obtain a measurement result based on the positioning reference signal. The sending module 502 is configured to send the measurement result to at least one of the network device or a location management function entity.

In some embodiments, the sending module 502 is configured, in at least one of the following manners, to send the measurement result to the network device via a PUSCH of MsgA or Msg3 during a random access process, or send the measurement result to the location management function entity via at least one of a non-access stratum message or a positioning protocol message.

Alternatively, the sending module 502 is configured to send the measurement result to the network device via a PUSCH after a terminal completes a random access process and switches to a connected state.

Alternatively, the sending module 502 is configured to send the measurement result to the location management function entity via a positioning protocol message after the terminal completes a random access process and switches to a connected state.

In some embodiments, the measurement result includes at least one of a signal strength measurement value, a time measurement value, or an angle measurement value.

For example, the signal strength measurement value includes at least one of RSRP, RSRQ, or RSSI. The time measurement value includes at least one of RSTD or a receiving and transmitting time difference. The angle measurement value includes at least one of AoD or AoA.

In some embodiments, the positioning apparatus further includes a switching module 505. The switching module 505 is configured to send transmission power values of the random access preambles for positioning to at least one of the network device or a location management function entity.

In some embodiments, the sending module 502 is configured, in at least one of the following manners, to send a unique identifier of a terminal to the network device via a PUSCH of MsgA or Msg3 during a random access process, or send the unique identifier of the terminal to the location management function entity via at least one of a non-access stratum message or a positioning protocol message.

Alternatively, the sending module 502 is configured, in at least one of the following manners, to send a unique identifier of a terminal to the network device through a PUSCH, or send the unique identifier of the terminal to the location management function entity via a positioning protocol message after the terminal completes a random access process and switches to a connected state.

For example, the unique identifier of the terminal may be a UE ID, and the UE ID may be one of a C-RNTI, a temporary C-RNTI, or a NAS UE ID.

Figure 7:
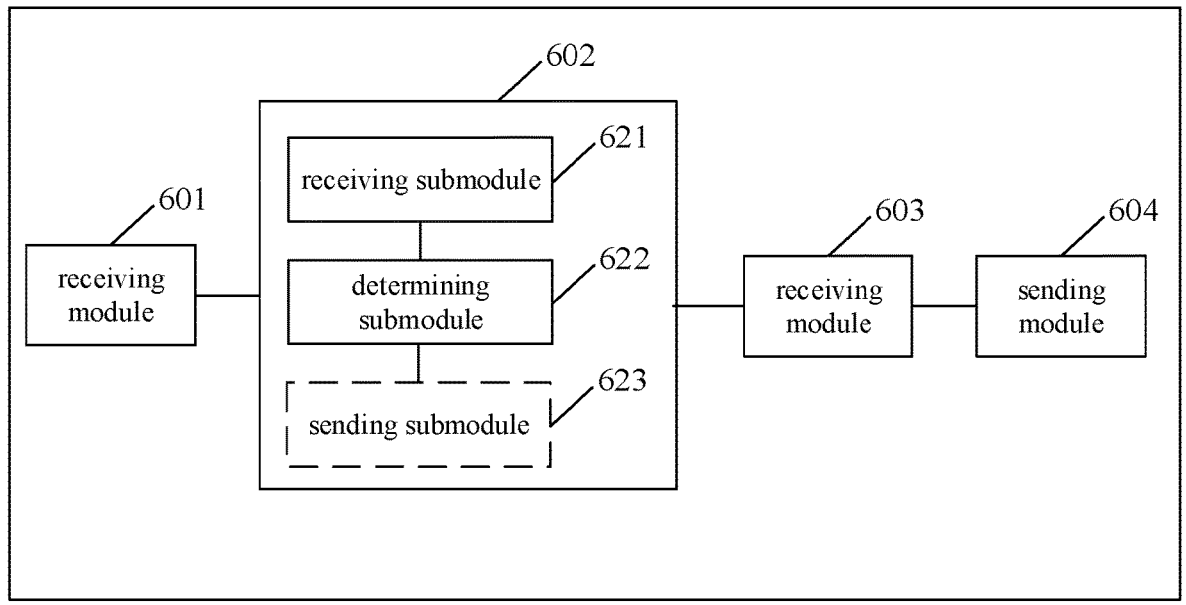
FIG. 7 is a schematic diagram illustrating a positioning apparatus according to an embodiment.

FIG. 7 is a schematic diagram illustrating a positioning apparatus according to an embodiment. The apparatus has the function of implementing the network device in the above-mentioned method embodiments. The function may be realized by hardware or by executing corresponding software with hardware. As shown in FIG. 7, the positioning apparatus includes a receiving module 601 and a positioning module 602.

The receiving module 601 is configured to receive random access preambles for positioning sent by a terminal with time domain resources and frequency domain resources of random access channels for positioning. The time domain resources and the frequency domain resources of the random access channels for positioning, and the random access preambles for positioning form random access resources for positioning. The positioning module 602 is configured to perform positioning measurement on the terminal in response to receiving the random access preambles for positioning.

In some embodiments, the random access resources for positioning and random access resources for random access are different in at least one of the time domain resources, the frequency domain resources or the preambles.

Alternatively, the time domain resources, the frequency domain resources and the preambles of the random access resources for positioning are the same as time domain resources, frequency domain resources and preambles of random access resources for random access, respectively.

In some embodiments, in random access resources corresponding to each synchronization signal block, a frequency domain resource with a lowest frequency point is allocated for positioning, and frequency domain resources with remaining frequency points are allocated for random access.

Alternatively, in random access resources corresponding to each synchronization signal block, an earliest time domain resource in a time domain is allocated for positioning, and remaining time domain resources are allocated for random access.

Alternatively, in random access resources corresponding to each synchronization signal block, a preamble with a smallest number is allocated for positioning, and preambles with remaining numbers are allocated for random access.

In some embodiments, the positioning module 602 includes a receiving submodule 621 and a determining submodule 622. The receiving submodule 621 is configured to receive transmission power values of the random access preambles for positioning sent by the terminal. The determining submodule 622 is configured to determine a distance between a network device and the terminal based on the transmission power values and a received signal strength value for receiving the random access preambles for positioning.

In some embodiments, the receiving submodule 621 is configured to receive the transmission power values sent by the terminal via a PUSCH of MsgA or Msg3 during a random access process.

Alternatively, the receiving submodule 621 is configured to receive the transmission power values sent by the terminal via a PUSCH when the terminal is in a connected state.

In some embodiments, the positioning module 602 includes a sending submodule 623, the receiving submodule 621 and the determining submodule 622. The sending submodule 623 is configured to send a positioning reference signal to the terminal. The receiving submodule 621 is configured to receive a measurement result sent by the terminal and obtained based on the positioning reference signal. The determining submodule 622 is configured to determine a distance between a network device and the terminal based on the measurement result.

In some embodiments, the receiving submodule 621 is configured to receive the measurement result sent by the terminal via a PUSCH of MsgA or Msg3 during a random access process.

Alternatively, the receiving submodule 621 is configured to receive the measurement result sent by the terminal via a PUSCH when the terminal is in a connected state.

In some embodiments, the measurement result includes at least one of a signal strength measurement value, a time measurement value, or an angle measurement value.

For example, the signal strength measurement value includes at least one of RSRP, RSRQ, or RSSI. The time measurement value includes at least one of RSTD or a receiving and transmitting time difference. The angle measurement value includes at least one of AoD or AoA.

In some embodiments, the positioning apparatus further includes a receiving module 603. The receiving module 603 is configured to receive a unique identifier sent by the terminal via a PUSCH of MsgA or Msg3 during a random access process.

Alternatively, the receiving module 603 is configured to receive the unique identifier sent by the terminal via a PUSCH when the terminal is in a connected state.

For example, the unique identifier of the terminal may be a UE ID, and the UE ID may be one of a C-RNTI, a temporary C-RNTI, or a NAS UE ID.

In some embodiments, the positioning apparatus further includes a sending module 604. The sending module 604 is configured to a synchronization signal block, broadcast information, system information or a PDCCH to the terminal, wherein the synchronization signal block, the broadcast information, the system information or the PDCCH is configured to indicate the random access resources for positioning.

Figure 8:
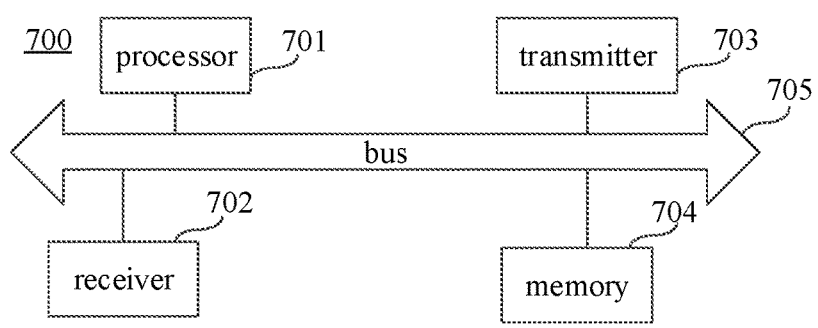
FIG. 8 is a block diagram illustrating a terminal according to an embodiment.

FIG. 8 is a block diagram illustrating a terminal 700 according to an embodiment. The terminal 700 may include a processor 701, a receiver 702, a transmitter 703, a memory 704 and a bus 705.

The processor 701 includes one or more processing cores, and the processor 701 executes various functional applications and information processing by running software programs and modules.

The receiver 702 and the transmitter 703 may be realized as a communication component, and the communication component may be a communication chip.

The memory 704 is connected to the processor 701 through the bus 705.

The memory 704 may be configured to store at least one instruction, and the processor 701 is configured to execute the at least one instruction to perform various steps in the above-mentioned method embodiments.

In addition, the memory 704 may be implemented by any type of volatile or non-volatile storage device or a combination thereof, such as a magnetic disk, an optical disk, an electrically erasable programmable read-only memory (EE-PROM), an erasable programmable read-only memory (EPROM), a static random access memory (SRAM), a read-only memory (ROM), a magnetic memory, a flash memory, or a programmable read-only memory (PROM).

In some embodiments, the present disclosure also provides a non-transitory computer-readable storage medium. The non-transitory computer-readable storage medium has stored therein at least one instruction, at least one program, a code set or an instruction set that, when loaded and executed by a processor, cause the processor to perform the positioning methods provided by the above-mentioned method embodiments.

Figure 9:
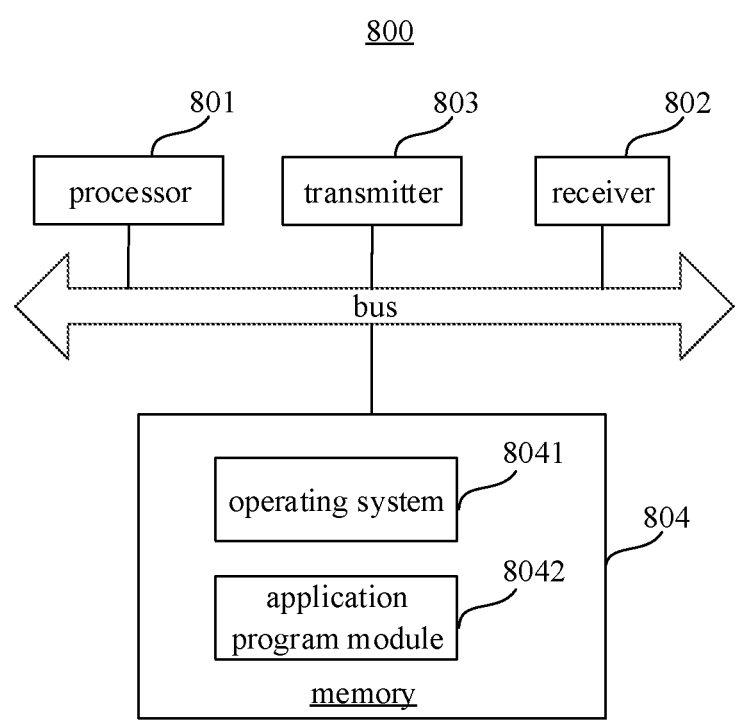
FIG. 9 is a block diagram illustrating a network device according to an embodiment.

FIG. 9 is a block diagram illustrating a network device 800 according to an embodiment. The network device 800 may include a processor 801, a receiver 802, a transmitter 803 and a memory 804. The receiver 802, the transmitter 803 and the memory 804 are respectively connected to the processor 801 through a bus.

The processor 801 includes one or more processing cores, and the processor 801 executes the positioning method performed by the network device in the positioning method provided by the embodiments of the present disclosure by running software programs and modules. The memory 804 may be used to store software programs and modules. Specifically, the memory 804 may store an operating system 8041 and an application program module 8042 required by at least one function. The receiver 802 is configured to receive communication data sent by other devices, and the transmitter 803 is configured to send communication data to other devices.

In some illustrative embodiments, the present disclosure also provides a non-transitory computer-readable storage medium. The non-transitory computer-readable storage medium has stored therein at least one instruction, at least one program, a code set or an instruction set that, when loaded and executed by a processor, cause the processor to perform the positioning methods provided by the above-mentioned method embodiments.

An illustrative embodiment of the present disclosure also provides a positioning system, where the positioning system includes a terminal and a network device. The terminal is the terminal provided in the embodiment shown in FIG. 8. The network device is the network device provided in the embodiment shown in FIG. 9.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A positioning method, comprising:
   determining, by a terminal, random access resources for positioning based on system information sent by a network device; wherein the random-access resources for positioning comprise time domain resources and frequency domain resources of random-access channels for positioning, and random-access preambles for positioning; wherein the random-access resources for positioning and random access resources for random access are different in at least one of the time domain resources, the frequency domain resources or the preambles;
   sending, by the terminal, the random access preambles for positioning to the network device with the time domain resources and the frequency domain resources of the random access channels for positioning; the network device is a network device of a serving cell of the terminal; further comprising: receiving, by the terminal, a positioning reference signal sent by the network device; obtaining, by the terminal, a measurement result based on the positioning reference signal; sending, by the terminal, the measurement result to at least one of the network device or a location management function entity;
   further comprising:
   sending transmission power values of the random-access preambles for positioning to at least one of the network device or a location management function entity, comprising at least one of:
   sending the transmission power values to the network device via a physical uplink shared channel (PUSCH) of MsgA or Msg3 during a random-access process;
   sending the transmission power values to the location management function entity via at least one of a non-access stratum message or a positioning protocol message.

2. The method according to claim 1, wherein in random access resources corresponding to a synchronization signal block, a frequency domain resource with a lowest frequency point is allocated for positioning, and frequency domain resources with remaining frequency points are allocated for random access; or
   in random access resources corresponding to a synchronization signal block, an earliest time domain resource in a time domain is allocated for positioning, and remaining time domain resources are allocated for random access; or
   in random access resources corresponding to a synchronization signal block, a preamble with a smallest number is allocated for positioning, and preambles with remaining numbers are allocated for random access.

3. The method according to claim 1, wherein determining the random access resources for positioning further comprises:
   determining the random access resources for positioning based on at least one of a synchronization signal block sent by the network device, broadcast information sent by the network device, a physical downlink control channel (PDCCH) sent by the network device, a positioning protocol message sent by a location management function entity, or a local storage.

4. The method according to claim 1, wherein before determining the random access resources for positioning, the method further comprises:
   determining a positioning request, wherein the positioning request is configured to indicate a terminal to determine the random access resources for positioning;
   wherein the positioning request comprises at least one of:
   a positioning request triggered by a service of the terminal;
   a positioning request sent from the network device and obtained by monitoring the network device; or
   a positioning request sent from at least one of an access and mobility management function entity, or a location management function entity.

5. The method according to claim 1, further comprising:
   sending transmission power values of the random-access preambles for positioning to at least one of the network device or a location management function entity, further comprising at least one of:
   sending the transmission power values to the network device via a PUSCH after a terminal completes a random-access process and switches to a connected state; or
   sending the transmission power values to the location management function entity via a positioning protocol message after a terminal completes a random-access process and switches to a connected state.

6. The method according to claim 1, wherein sending the measurement result to at least one of the network device or the location management function entity comprises at least one of:
- sending the measurement result to the network device via a PUSCH of MsgA or Msg3 during a random access process;
- sending the measurement result to the location management function entity via at least one of a non-access stratum message or a positioning protocol message;
- sending the measurement result to the network device via a PUSCH after a terminal completes a random access process and switches to a connected state; or
- sending the measurement result to the location management function entity via a positioning protocol message after the terminal completes a random access process and switches to a connected state.

7. The method according to claim 1, wherein the measurement result comprises at least one of a signal strength measurement value, a time measurement value, or an angle measurement value.

8. The method according to claim 1, further comprising: switching back to an idle state after sending the measurement result or completing a random access process.

9. The method according to claim 1, further comprising at least one of:
- sending a unique identifier of a terminal to the network device via a PUSCH of MsgA or Msg3 during a random access process;
- sending a unique identifier of a terminal to the location management function entity via at least one of a non-access stratum message or a positioning protocol message;
- sending a unique identifier of a terminal to the network device through a PUSCH after the terminal completes a random access process and switches to a connected state; or
- sending a unique identifier of a terminal to the location management function entity via a positioning protocol message after the terminal completes a random access process and switches to a connected state.

10. A positioning method, comprising:
- sending, by a network device, system information to a terminal, wherein the system information is configured to indicate the random-access resources for positioning;
- receiving, by a network device, random access preambles for positioning sent by the terminal with time domain resources and frequency domain resources of random access channels for positioning based on the system information; wherein the time domain resources and the frequency domain resources of the random access channels for positioning, and the random access preambles for positioning form random access resources for positioning; wherein the random access resources for positioning and random access resources for random access are different in at least one of the time domain resources, the frequency domain resources or the preambles;
- performing, by the network device, positioning measurement on the terminal in response to receiving the random-access preambles for positioning;
wherein performing positioning measurement on the terminal comprises:
- sending, by the network device, a positioning reference signal to the terminal;
- receiving, by the network device, a measurement result sent by the terminal and obtained based on the positioning reference signal, wherein the measurement result comprises at least one of a signal strength measurement value, a time measurement value, or an angle measurement value;
- determining, by the network device, a distance between a network device and the terminal based on the measurement result;
- wherein the network device is a network device of a serving cell of the terminal;
- receiving transmission power values sent by the terminal via a PUSCH of MsgA or Msg3 during a random-access process.

11. The method according to claim 10, wherein in random access resources corresponding to a synchronization signal block, a frequency domain resource with a lowest frequency point is allocated for positioning, and frequency domain resources with remaining frequency points are allocated for random access; or
- in random access resources corresponding to a synchronization signal block, an earliest time domain resource in a time domain is allocated for positioning, and remaining time domain resources are allocated for random access; or
- in random access resources corresponding to a synchronization signal block, a preamble with a smallest number is allocated for positioning, and preambles with remaining numbers are allocated for random access.

12. The method according to claim 10, wherein performing positioning measurement on the terminal comprises: receiving transmission power values of the random access preambles for positioning sent by the terminal; determining a distance between a network device and the terminal based on the transmission power values and a received signal strength value for receiving the random access preambles for positioning, wherein receiving the transmission power values of the random access preambles for positioning sent by the terminal further comprises:
- receiving the transmission power values sent by the terminal via a PUSCH when the terminal is in a connected state.

13. The method according to claim 10, wherein receiving the measurement result sent by the terminal and obtained based on the positioning reference signal comprises:
- receiving the measurement result sent by the terminal via a PUSCH of MsgA or Msg3 during a random access process; or
- receiving the measurement result sent by the terminal via a PUSCH when the terminal is in a connected state.

14. The method according to claim 10, further comprising:
- receiving a unique identifier sent by the terminal via a PUSCH of MsgA or Msg3 during a random access process; or
- receiving the unique identifier sent by the terminal via a PUSCH when the terminal is in a connected state.

15. The method according to claim 10, further comprising:
- sending a synchronization signal block, broadcast information, or a PDCCH to the terminal, wherein the synchronization signal block, the broadcast information, or the PDCCH is configured to indicate the random access resources for positioning.

16. A network device, comprising:
a processor;

a memory for storing instructions executable by the processor;

wherein the processor is configured to load and execute the executable instructions to perform the positioning method according to claim 10.

17. A terminal, comprising:

a processor;

a memory for storing instructions executable by the processor; wherein the processor is configured to load and execute the executable instructions to perform a positioning method, the positioning method comprising:

determining, by a terminal, random access resources for positioning based on system information sent by a network device; wherein the random access resources for positioning comprise time domain resources and frequency domain resources of random access channels for positioning, and random access preambles for positioning; wherein the random access resources for positioning and random access resources for random access are different in at least one of the time domain resources, the frequency domain resources or the preambles; sending, by the terminal, the random access preambles for positioning to the network device with the time domain resources and the frequency domain resources of the random access channels for positioning; the network device is a network device of a serving cell of the terminal;

further comprising: receiving, by the terminal, a positioning reference signal sent by the network device; obtaining, by the terminal, a measurement result based on the positioning reference signal; sending, by the terminal, the measurement result to at least one of the network device or a location management function entity;

further comprising:

sending transmission power values of the random-access preambles for positioning to at least one of the network device or a location management function entity, comprising at least one of:

sending the transmission power values to the network device via a physical uplink shared channel (PUSCH) of MsgA or Msg3 during a random-access process;

sending the transmission power values to the location management function entity via at least one of a non-access stratum message or a positioning protocol message.

* * * * *